Dec. 16, 1952 — W. J. FORDON — 2,621,689
PROTRACTOR SAW
Filed April 19, 1949
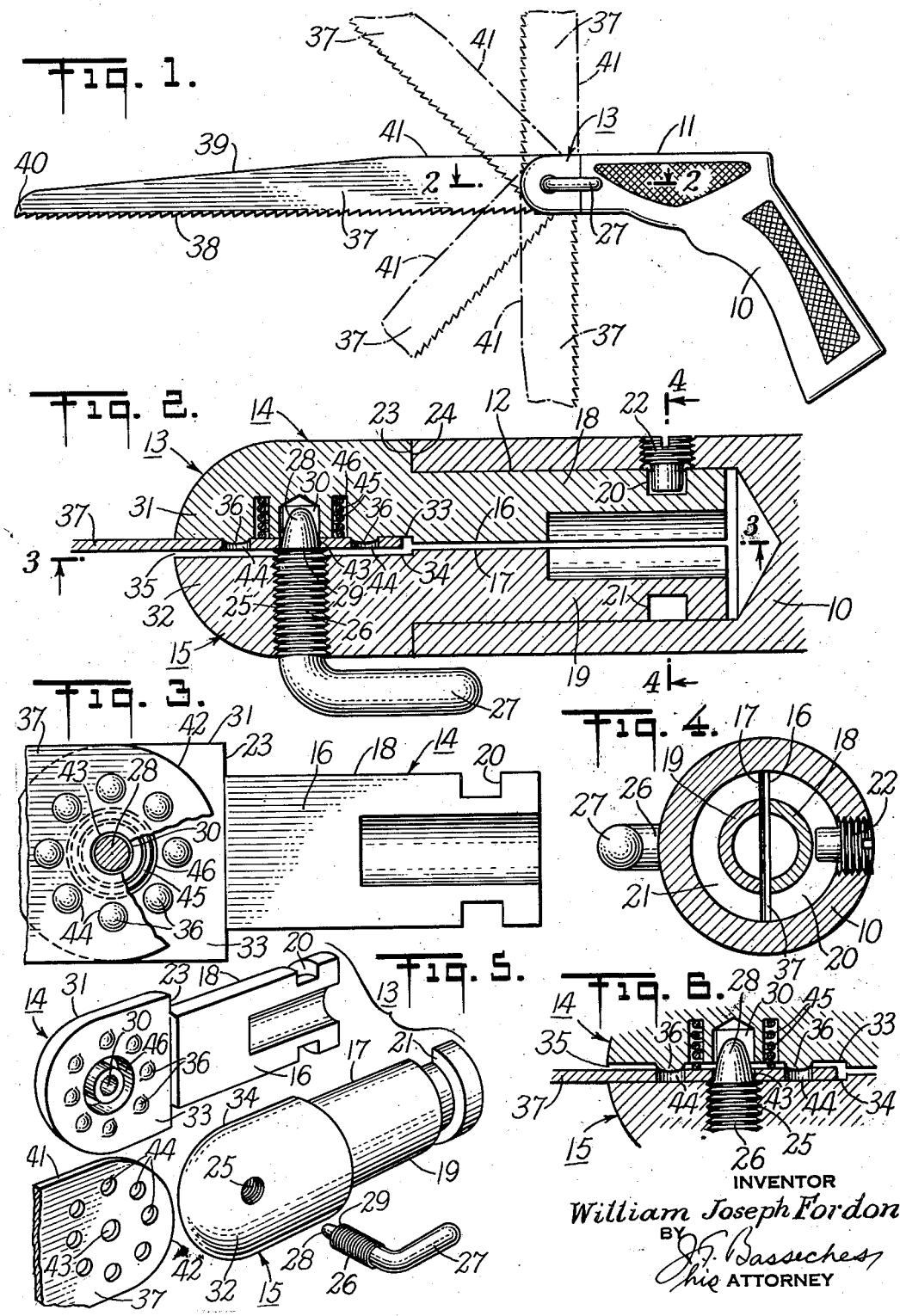
INVENTOR
William Joseph Fordon
BY
J. G. Basseches
his ATTORNEY Patented Dec. 16, 1952

2,621,689

UNITED STATES PATENT OFFICE 2,621,689

PROTRACTOR SAW

William Joseph Fordon, Bronx, N. Y., assignor to Rose Gringer, New York, N. Y.

Application April 19, 1949, Serial No. 88,282

2 Claims. (Cl. 145—108)

This invention relates to hand saws, and more particularly to a combination hand saw and protractor, and still more particularly to protractor saw blades.

My invention involves an improvement over my Patent No. 2,286,530 of June 16, 1942. In the aforementioned patent I have provided a tool holder for saw blades having rotatable mounting means for holding the blade at any desired angle about an axis and including single means for releasably locking a blade shank. The saw blade contemplated by me in said invention is of the type generally referred to as a keyhole or fret saw type, having a narrow blade which tapers to a sharp point, whereby scroll work of irregular contour may be followed and sawed. Such work is frequently encountered by electricians, plumbers, repair men or other workmen who are obliged to form cutouts in difficultly accessible locations, requiring that the saw thrusts be accommodated to the location of the work rather than to move the work to effect a more convenient use of the saw.

Accordingly, it is an object of my invention to provide a saw blade holder which may endwise clamp a saw blade for a universally angular positioning of the handle and blade to each other, to secure both axial and transverse adjustment of the handle pressure area to the saw teeth of the blade, and more specifically to provide in single controlled clamping means for releasably locking the blade, an intermediate locking of the blade and handle whereby protractor adjustment of the blade edge and handle may be effected, without completely releasing the saw blade and handle.

Still more particularly it is contemplated by my invention, and it is an object thereof to provide, a tool handle for saw blades or similar pushing tool blades whereby the blade and handle may be universally releasably locked with relation to each other, to secure an angular position of the blade to the effective pushing grip of the handle, and including single means for releasably locking these elements with respect to each other angularly, both axially and transversely, whereby the handle and blade edge may be adjusted and used as a protractor or bevel square.

Still more particularly it is contemplated by my invention and it is an object thereof to provide, a tool handle for saw blades or similar pushing tool blades whereby a blade and handle may be universally, releasably located with relation to each other, to secure an angular position of the blade to the effective pushing area of the handle and including single means for releasably locking these elements with respect to each other angularly, both axially and transversely, whereby the handle and blade edge may be adjusted and used as a protractor or bevel square.

Still more particularly it is contemplated by my invention, and it is an object thereof to provide, a saw blade for use in a universally, releasably engageable handle which combines with the handle to serve as a protractor or bevel square and includes means on the blade whereby the blade locking means are positioned with respect to an edge thereof to provide protractor indicia, whereby the blade has utility with the handle or by itself for a multiplicity of purposes.

To attain these objects and such further objects as may appear herein, or be hereinafter pointed out, I make reference to the accompanying drawing forming a part hereof, in which—

Figure 1 is a plan view showing my handle and saw blade;

Figure 2 is a magnified section taken on the line 2—2 of Figure 1;

Figure 3 is a fragmentary section taken on the line 3—3 of Figure 2;

Figure 4 is a section taken on the line 4—4 of Figure 2;

Figure 5 is an exploded perspective view of the saw blade end and clamp;

Figure 6 is a fragmentary section, similar to Figure 2, showing the clamp in position for shifting the blade.

Making reference to the drawing, I show a handle 10 which is generally of the pistol grip type, having a straight edge 11 and socket 12 of cylindrical contour, whose axis is parallel to the edge 11. The socket 12 is arranged to receive the clamp 13 comprising segments 14 and 15, having complemental faces 16 and 17 contiguously positioned and diametrically arranged in the socket, and having semi-cylindrical shank portions 18 and 19. Annular grooves 20 and 21 in the segments 14 and 15, respectively, are arranged to receive the screw pin 22, to retain the segments from displacement while permitting rotative movement of the segments within the socket 12.

The segments are each formed with shoulder portions 23, abutting the rim 24 of the socket of the handle. The segment 15 has a screw threaded boring 25, to threadedly receive the set screw 26. A transversely bent portion 27 forms the handle to supply the leverage and mechanical advantage to the screw 26, as will be readily understood. The screw threaded set screw 26 terminates in a pivot pin 28 and includes an annular shoulder 29, providing a bearing surface for purposes which will appear as this description proceeds.

The pivot pin 28 is arranged to project in a socket 30, formed in the segment 14. Each of the segments 14 and 15 adjacent the heads 31 and 32, respectively, are formed with opposed blade seats 33 and 34, outlining a blade slot 35, said seats dimensionally being related to each other as will appear as this description proceeds.

The face of the seat 33 is formed with a plurality of symmetrically positioned protractor locking lugs 36 which are spaced radially and concentrically with the axial line through the socket 30 and the cooperating pivot 28. The extent of projection of the lugs 36 is dimensionally calculated with relation to the slot 35 and the blade to be seated thereon. In the construction illustrated the blade is of a thickness to be twice approximately the extension of the lugs 36 above the face of the seat 33. The slot 35 defined by the seats 33 and 34 is cut out to allow for clearance of the blade over the extension of the lugs 36 when the screw 26 is released as described hereinbelow.

With a construction thus provided, I furnish a blade 37 having the usual saw teeth 38 on one edge and a non-cutting edge 39 tapering out toward the pointed end 40 in one direction, and merging into a straight edge 41 to the butt of the blade tangentially to the semi-circular end 42. Concentric with the circle defined by the semi-circular end 42 there is provided a boring 43 forming a pivot bearing and protractor apertures 44 which are radially spaced and concentrically positioned with respect to the boring 43 for a distance complementary to the protractor lugs 36. While I have illustrated eight protractor apertures 44 to correspond to the eight protractor lugs 36 for laying out angles of 45°, it will be understood that the angular protractor points may be varied in accordance with the degree of division which may be found desirable.

With the construction as provided, the saw blade is inserted in the slot 35 provided by the seated portions 33 and 34 by retracting the set screw 26. When the pivot point 28 has been withdrawn sufficiently, the blade end 42 may be slid into the slot 35 and the set screw 27 moved clockwise, to enter the boring 43. Radial adjustment of the blade 37 is then possible, to seat the protractor borings 44 upon the protractor lugs 36. Progressive turning of the set screw 26 serves to project the pivot pin 28 in the boring 43 of the blade until the shoulder 29 engages the blade face, driving the blade against the seat 33 and progressively spreading the segments 14 and 15 until the cylindrical surfaces 18 and 19 engage the socket 12 frictionally, to bind the clamp 13 against rotation in the socket and to bind the blade against pivotal movement in the slot 35.

By retracting the set screw 26 slightly for the height of the protractor lugs 36, enough clearance is afforded within the slot to tilt the blade in any of the positions shown in Figure 1 about the pivot pin portion 28 of the set screw. I may form the exposed surfaces of the protractor lugs 36 arcuately, to cam the saw blade with friction from engagement with the lugs in adjusting the blade in any predetermined tilted position upon partial retraction of the set screw 26 within limits corresponding to the height of the protractor lug 36 beyond the surface of the seat 33. The unseating of the protractor apertures 44 from the protractor lugs may be facilitated by the expansion spring 45 which is fitted within the annular slot 46 concentrically with the socket 30 although this spring may be entirely omitted. Thus, upon retracting the set screw 26, the spring 45 may unseat the blade from engagement with the protractor lugs 36, while frictionally retaining the blade on the pivot 28 for pivotal adjustment.

I may cut the pitch of the threads of the set screw 26 so that one complete revolution thereof counter-clockwise withdraws the shoulder 29 from engagement with the saw blade and releases the frictional spread of the segments 14 and 15 from the socket, to permit of the tilting of the blade in the slot 35 or the rotary adjustment of the clamp 13 in the socket 12, while still retaining a sufficient frictional engagement of the clamp and socket to each other and the blade 37 in the seat therefor to hold any adjustment.

In use, the edge 41 may be adjusted with relation to the edge 11 to provide an adjustable bevel square within the range of angular variants determined by the angular positioning of the protractor borings 44, enough frictional engagement being afforded upon withdrawal of the set screw 26 for about the thickness of the lugs 36 and the machining tolerances to permit rotary as well as angular tilting of the blade. When driving the set screw 26 to abut the shoulder 29 against the face of the blade, positive locking of the blade is secured as the protractor borings 44 receive the lugs 36, while frictional rotary locking is obtained as the segments 14 and 15 are spread against the socket walls 12. Thus a single means effects both a radial and axial locking of the clamp with relation to the handle.

By my construction, simple manipulation of the handle 27 with one hand leaves the other hand free to adjust the saw, making possible quick manipulation for the various purposes outlined.

It will be understood that the blade itself has utility as a protractor, using the boring or bearing aperture 43 as a center for laying out angular markings, employing the protractor borings 44 thereof as indicia, to determine the angle desired and the straight edge 41.

Thus it will be observed that I have provided a holder for a blade whereby a rotary axial clamping and tilting clamping of the blade with regard to the handle may be effected by a single clamping adjustment in a universal number of positions, to secure the most effective relationship of the handle to the saw blade as unusual sawing or cutting positions may be encountered.

It will thus be observed that I have provided a novel tool clamp, handle and blade.

Having thus described my invention and illustrated its use, what I claim as new and desire to secure by Letters Patent, is:

1. A protractor saw comprising a handle including a socket, a clamp rotatable in said socket and including separable spaced segments having shank portions extending into the socket of the handle and having separable jaw portions located externally of the socket, blade seats formed on confronting faces of the segment jaw portions, locking means extending transversely through one jaw portion, means to advance or retract said locking means, said locking means including a pivot pin extending into a recess in said other jaw portion and having a shoulder portion opposed to the seat of the other jaw portion, a blade including a shank portion with a central aperture through which the pivot pin extends so that when said locking means is advanced toward the other jaw portion, said shoulder will clamp the blade shank against the seat of the other jaw portion, the longitudinal axis of the blade being thereby held in selective angular relationship with respect to the axis of the handle and simultaneously the segments will be separated to frictionally secure their shanks in the handle socket and thereby retain the clamp in any position to which it has been rotated.

2. A blade for use with a protractor saw comprising a handle including a socket and a clamp in said socket having spaced segments, one end of said segment having shank portions extending into the socket and the other end of said segments having separable jaw portions located externally of the socket and wherein blade seats are formed on confronting faces of the segment jaw portions, locking means extending transversely through one jaw portion, including a pivot pin extending into a recess of the other jaw portion, said pivot pin having a shoulder portion opposed to the seat of said other jaw, the blade seats have one of the confronting faces formed with a group of protractor lugs concentric with said blade having a central aperture and a group of concentric apertures complementally positioned to the protractor legs to receive said protractor lugs for angularly adjusting the handle and blade in relation to each other in accordance with the protractor points of said blade apertures and lugs, respectively.

WILLIAM JOSEPH FORDON.

REFERENCES CITED

The following references are of record in the file of this patent:

UNITED STATES PATENTS

| Number | Name | Date |
|---|---|---|
| 703,334 | Carey | June 24, 1902 |
| 784,674 | Haag | Mar. 14, 1905 |
| 1,285,513 | Wheeler | Nov. 19, 1918 |
| 1,800,349 | Hurason | Apr. 14, 1931 |
| 2,286,530 | Fordon | June 16, 1942 |